(12) United States Patent
Li et al.

(10) Patent No.: US 11,575,256 B2
(45) Date of Patent: Feb. 7, 2023

(54) MATRIX CONVERTER WITH SOLID STATE CIRCUIT BREAKER

(71) Applicant: EATON INTELLIGENT POWER LIMITED, Dublin (IE)

(72) Inventors: Huaqiang Li, Menomonee Falls, WI (US); Xin Zhou, Wexford, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 133 days.

(21) Appl. No.: 16/756,310

(22) PCT Filed: Aug. 29, 2018

(86) PCT No.: PCT/IB2018/056587
§ 371 (c)(1),
(2) Date: Apr. 15, 2020

(87) PCT Pub. No.: WO2019/043594
PCT Pub. Date: Mar. 7, 2019

(65) Prior Publication Data
US 2021/0376593 A1 Dec. 2, 2021

Related U.S. Application Data

(60) Provisional application No. 62/551,581, filed on Aug. 29, 2017.

(51) Int. Cl.
*H02M 1/14* (2006.01)
*H02M 7/23* (2006.01)
(Continued)

(52) U.S. Cl.
CPC ........ *H02H 7/0822* (2013.01); *H02H 1/0007* (2013.01); *H02M 5/293* (2013.01)

(58) Field of Classification Search
CPC ................................. H02H 3/16; H02H 7/122
See application file for complete search history.

(56) References Cited

U.S. PATENT DOCUMENTS 4,896,242 A    1/1990  Neft
9,112,414 B2 *  8/2015  Inomata ................ H02M 5/297
(Continued)

FOREIGN PATENT DOCUMENTS

CN    204681285       9/2015
JP    2006-109583 A   4/2006
WO    2016157391      10/2016

OTHER PUBLICATIONS

China National Intellectual Property Administration, "First Office Action" (includes English language translation of same) from corresponding Chinese Application No. 201880053581.1, dated Dec. 30, 2021, 16 pp.

(Continued)

*Primary Examiner* — Muhammad S Islam
*Assistant Examiner* — Charles S Laughlin
(74) *Attorney, Agent, or Firm* — Eckert Seamans Cherin & Mellott, LLC (57) ABSTRACT

A matrix converter includes one or more current sensors structured to sense current flowing through the matrix converter, a matrix of switches including a number of solid state transistors, and a control circuit structured to detect faults in power flowing through the matrix converter based on the sensed current, to control the matrix of switches to drive an external device, and to control the matrix of switches to switch to prevent power from flowing internal to the matrix converter, or external to the external device in response to detecting a fault in power flowing through the matrix converter.

13 Claims, 8 Drawing Sheets

(51) Int. Cl.
 H02H 7/08 (2006.01)
 H02H 1/00 (2006.01)
 H02M 5/293 (2006.01)

(56) References Cited

U.S. PATENT DOCUMENTS

| | | | |
|---|---|---|---|
| 2006/0256470 A1* | 11/2006 | Juds | H01H 33/38 |
| | | | 360/123.57 |
| 2008/0130183 A1 | 6/2008 | Kawashima | |
| 2010/0246217 A1* | 9/2010 | Sakakibara | H02M 1/126 |
| | | | 363/37 |
| 2013/0235618 A1* | 9/2013 | Dillig | H02H 7/1216 |
| | | | 363/16 |

OTHER PUBLICATIONS

European Patent Office, "International Search Report", from priority document PCT/IB2018/056587, dated Dec. 19, 2018, 3 pp.

Augdahl B.W et al.: "Output Protection Strategies for Matrix Converters in Distributed Generation Applications", THE 2006 IEEE Industry Applications Conference Forty-First IAS Annual Meeting, Conference Record Of, IEEE, Piscataway, NJ, US, Oct. 1, 2006, pp. 2082-2089, XP031026309, DOI: 10.1109/IAS.2006. 256822 ISBN: 978-1-4244-0364-6.

Augdahl B.W. et al. "Output protection strategies for battlefield power supplied by matrix converters", Power Symposium, 2005. Proceedings of the 37th Annual North American Ames, IA, USA Oct. 23-25, 2005, Piscataway, NJ, USA, IEEE, Oct. 23, 2005 (Oct. 23, 2005), pp. 151-158, XP010865521,DOI: 10.1109/NAPS.2005. 1560517 ISBN: 978-0-7803-9255-7.

Augdahl B W et al, "Output Protection Strategies for Matrix Converters in Distributed Generation Applications", The 2006 IEEE Industry Applications Conference Forty-First IAS Annual Meeting, Conference Record Of, IEEE, Piscataway, NJ, US, Oct. 1, 2006, 2082-2089, XP031026309, ISBN 978-1-4244-0364-6, DOI: 10.1 109/IAS. 2006.256822 (no English translation available).

Japanese Patent Office "Notice of Reasons for Rejection" dated Jul. 27, 2022 (mailed on Aug. 3, 2022), for corresponding JP Patent Application No. 2020-510568, 6 pp.

* cited by examiner

MATRIX CONVERTER WITH SOLID STATE CIRCUIT BREAKER

CROSS-REFERENCE TO RELATED APPLICATIONS

This application claims priority from U.S. Provisional Patent Application Ser. No. 62/551,581, filed Aug. 29, 2017, entitled "MATRIX CONVERTER WITH SOLID STATE CIRCUIT BREAKER", the contents of which are incorporated herein by reference.

BACKGROUND

Field

The disclosed concept relates generally to AC-AC converters, and in particular, to matrix converters.

Background Information

Figure 1:
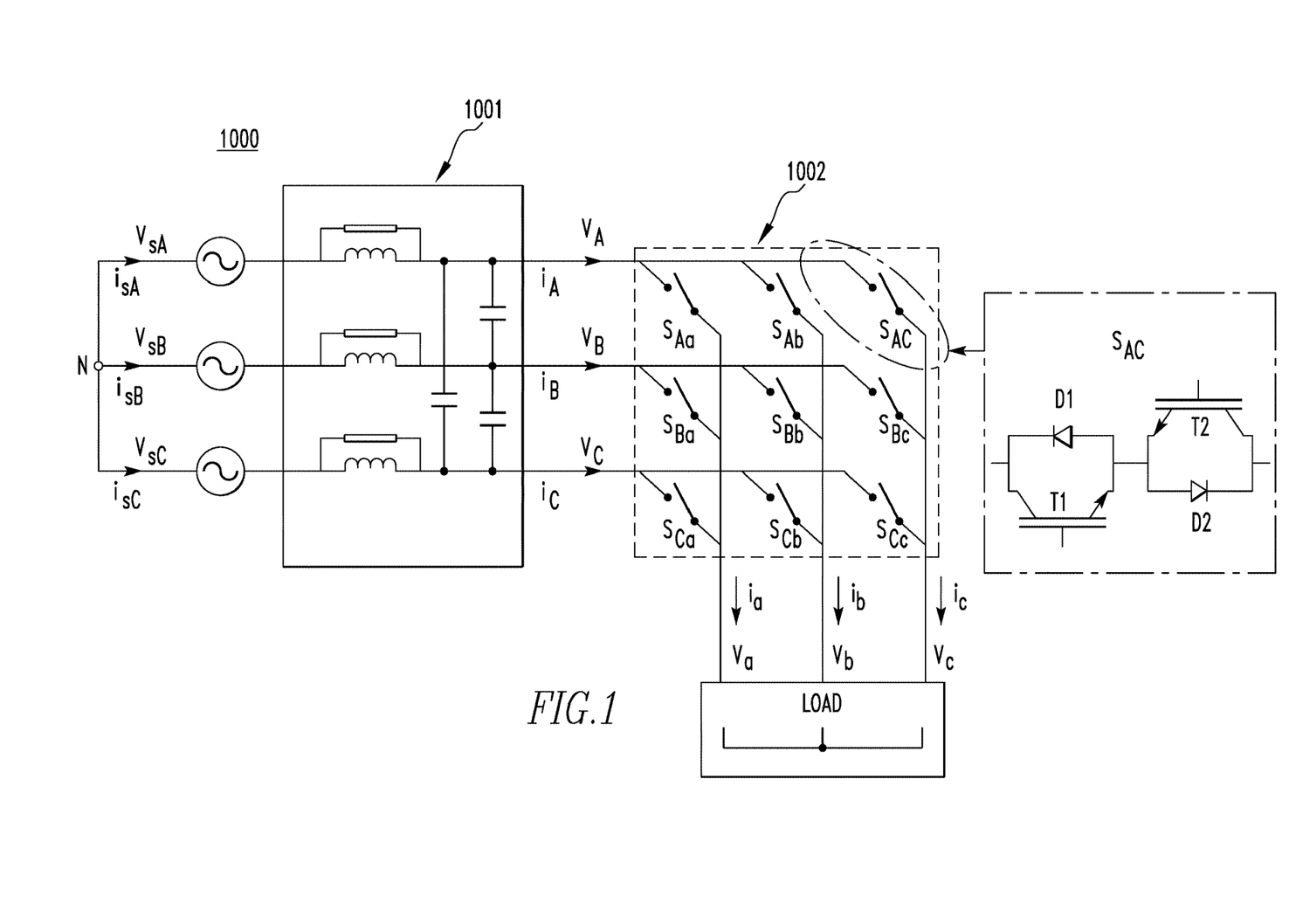
FIG. 1 is a diagram of a matrix converter.

Matrix converters are a type of AC-AC converter that uses a matrix of switches to convert AC power from a power source to AC power for use by a load. FIG. 1 shows an example of a matrix converter 1000. The matrix converter includes an input filter 1001 and a matrix of switches 1002. The matrix of switches 1002 are connected between inputs and outputs of the matrix converter 1000. The power at the outputs of the matrix converter 1000 can be controlled by selectively controlling the switches included in the matrix of switches 1001.

There is a mathematical relationship between the inputs and outputs of the matrix of switches 1001 based on the states of the switches as shown by the following equation:

$$\begin{bmatrix} V_a(t) \\ V_b(t) \\ V_c(t) \end{bmatrix} = \begin{bmatrix} S_{Aa}(t) & S_{Ba}(t) & S_{Ca}(t) \\ S_{Ab}(t) & S_{Bb}(t) & S_{Cb}(t) \\ S_{Ac}(t) & S_{Bc}(t) & S_{Cc}(t) \end{bmatrix} \begin{bmatrix} V_A(t) \\ V_B(t) \\ V_C(t) \end{bmatrix} \quad \text{Equation 1}$$

$$\begin{bmatrix} i_A(t) \\ i_B(t) \\ i_C(t) \end{bmatrix} = \begin{bmatrix} S_{Aa}(y) & S_{Ab}(t) & S_{Ac}(t) \\ S_{Ba}(t) & S_{Bb}(t) & S_{Bc}(t) \\ S_{Ca}(t) & S_{Cb}(t) & S_{Cc}(t) \end{bmatrix} \begin{bmatrix} i_a(t) \\ i_b(t) \\ i_c(t) \end{bmatrix}$$

where the switches are given a value of 1 when they are closed and a value of 0 when they are open. Matrix multiplication can be used to determine the voltages and currents at the outputs of the matrix of switches 1002 based on the voltages and currents at the inputs of the matrix of switches 1002 and the states of the switches. By controlling the states of the switches, the voltages and currents at the outputs of the matrix of switches 1002 can be controlled.

Figure 2:
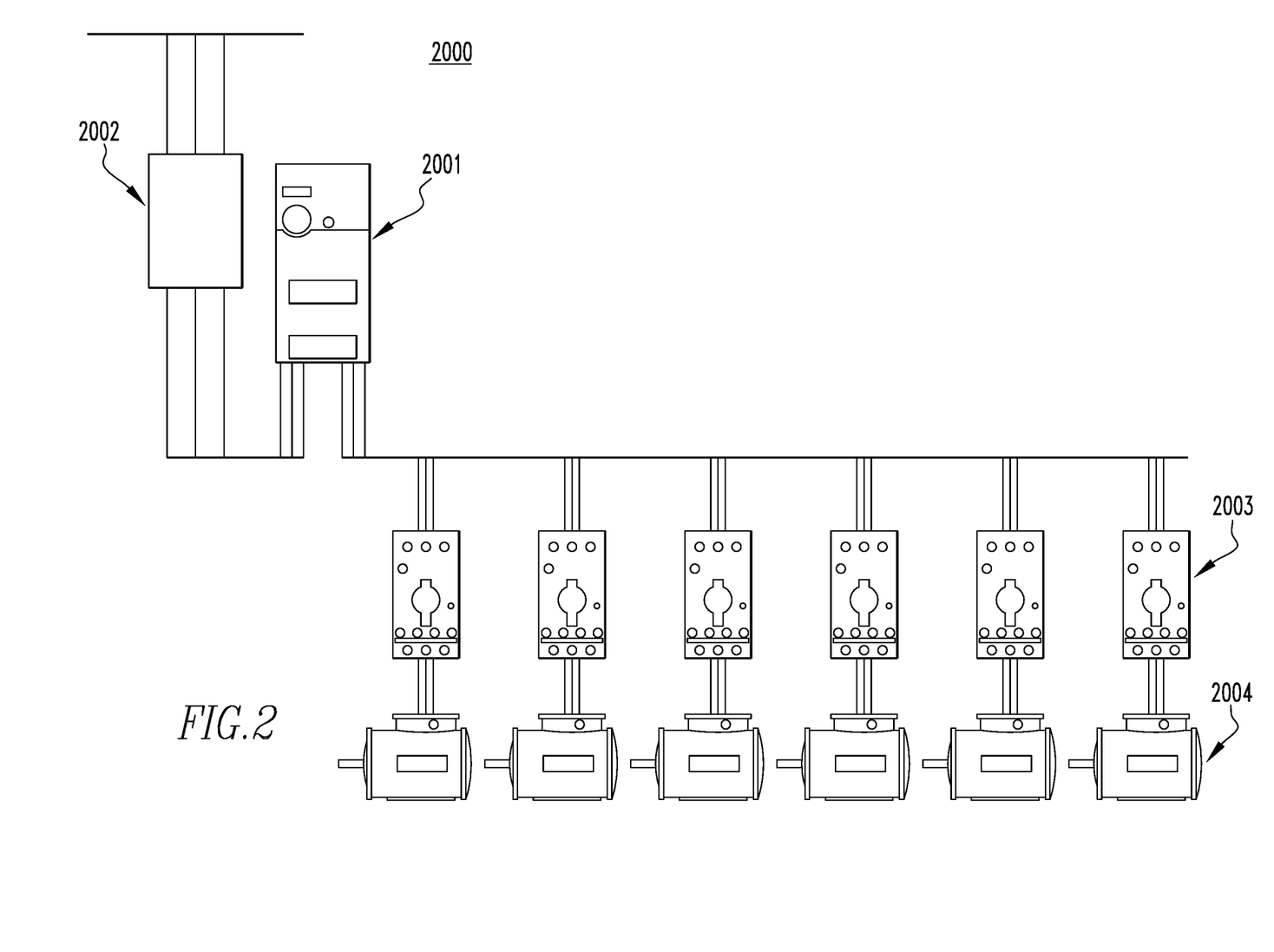
FIG. 2 is a diagram of an electric motor and drive system.

Matrix converters have been employed as drives for electric motors. To provide circuit protection, circuit breakers or fuses are provided in addition to the matrix converter. The addition of the circuit breakers or fuses adds to the cost and complexity of the electric motor system. The circuit breakers and fuses themselves and the necessity of wiring the circuit breakers or fuses to the motor starter and/or motor controller adds cost to the system. FIG. 2 shows an example of an electric motor system 2000. The electric motor system 2000 of FIG. 2 includes an electric motor drive 2001, a branch circuit breaker 2002, motor circuit breakers 2004, and motors 2004. As shown in FIG. 2 various circuit breakers 2002,2003 are provided to protect the system 2000. There is room for improvement in matrix converters.

SUMMARY

In accordance with an aspect of the disclosed concept, a matrix converter comprises: one or more current sensors structured to sense current flowing through the matrix converter; a matrix of switches including a number of solid state transistors; and a control circuit structured to detect faults in power flowing through the matrix converter based on the sensed current, to control the matrix of switches to drive an external device, and to control the matrix of switches to switch to prevent power from flowing internal to the matrix converter, or external to the external device in response to detecting a fault in power flowing through the matrix converter.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "processor" shall mean a programmable analog and/or digital device that can store, retrieve, and process data; a microprocessor; a microcontroller; a microcomputer; a central processing unit; or any suitable processing device or apparatus.

Figure 3:
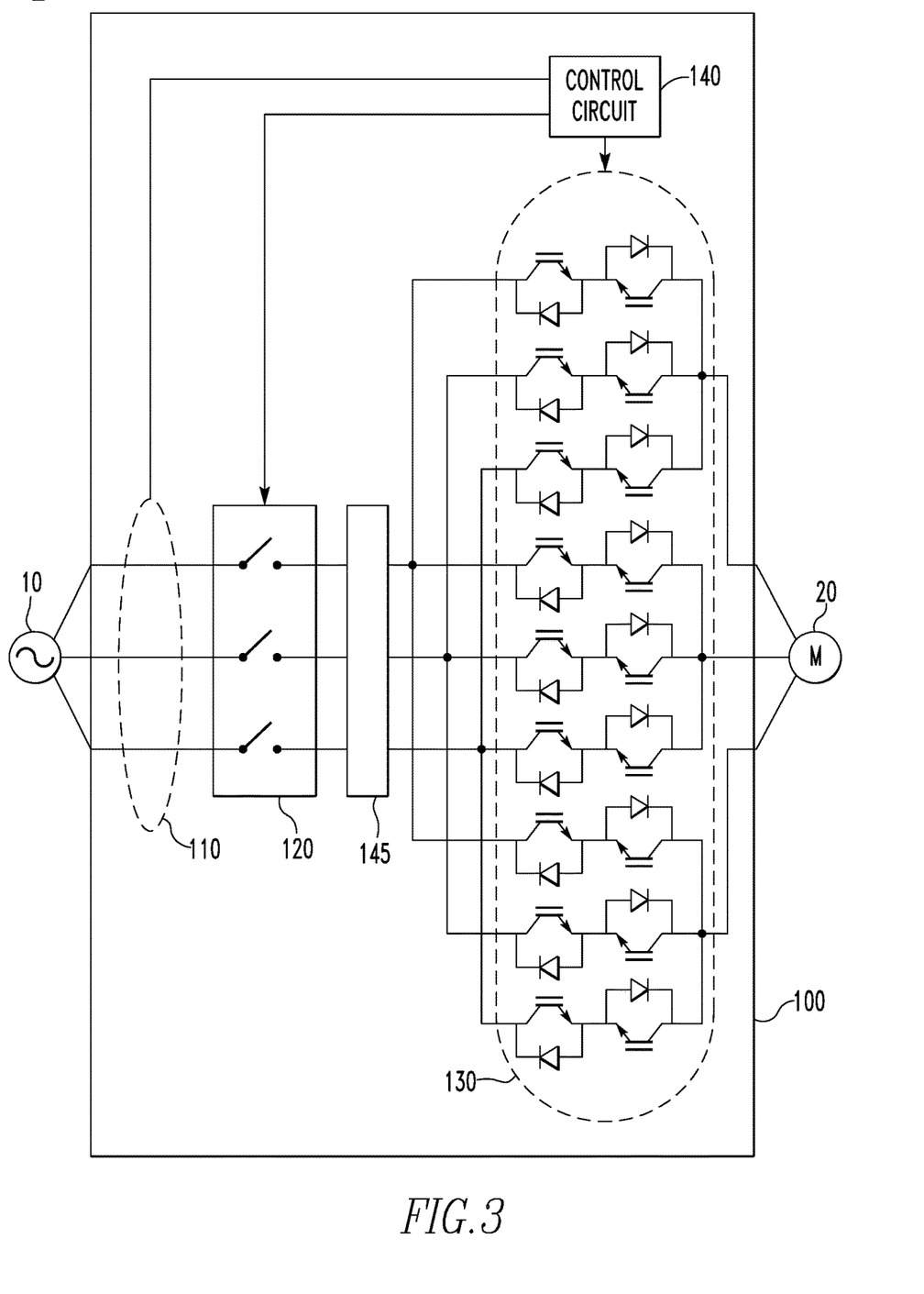
FIG. 3 is a diagram of an electric motor and drive system that includes a matrix converter in accordance with an example embodiment of the disclosed concept.

FIG. 3 is a diagram of an electric motor and drive system 1 in accordance with an example embodiment of the disclosed concept. The electric motor and drive 1 includes a power source 10, an electric motor 20, and a matrix converter 100 electrically coupled between the power source 10 and the electric motor 20. The matrix converter 100 is structured to drive the electric motor 20 by converting power from the power source 10 by using a matrix of switches 130.

The matrix converter 100 includes one or more current sensors 110 (e.g., without limitation, current transformers), an isolation switch 120, a matrix of switches 130, a control circuit 140, and an input filter 145. The input filter 145 may be similar to the one shown in FIG. 1. It will be understood by those having ordinary skill in the art that the matrix converter 100 may include one or more other types of sensors (e.g., without limitation, voltage sensors, temperature sensors, etc.), although such other sensors are not illustrated in FIG. 3. The matrix converter 100 provides the functionality of a solid state circuit breaker. In some example embodiments of the disclosed concept, the matrix converter 100 is able to detect faults (e.g., without limitation, arc fault, ground fault, overcurrent, etc.) and responsively initiate a trip to stop current from flowing internal to the matrix converter 100, or external to the electric motor 20.

The isolation switch 120 is electrically coupled between an input to the matrix converter 100 and the matrix of switches 130. Opening the isolation switch 110 provides galvanic isolation. The matrix converter 100 may also include a magnetic actuator (not shown). The magnetic actuator may actuate to open the isolation switch 120. Opening of the isolation switch 120 is controlled by the control circuit 140. In some example embodiments of the disclosed concept, the isolation switch 120 is a clinch joint. The clinch joint design allows the contact structure to utilize current generated magnetic force to keep the contact closed during overload or short circuit events without a large switching mechanism with very high contact spring force. However, it will be appreciated that other types of switches may be employed without departing from the scope of the disclosed concept.

The matrix of switches 130 includes a number of switches arranged in a matrix between inputs and outputs of the matrix converter 100. The switches may be comprised of solid state components such as transistors. In some example embodiments of the disclosed concept, the switches may be bi-directional switches comprised of, for example, a transistor and a diode. It will be appreciated by those having ordinary skill in the art that any suitable type of transistor may be employed in the switches such as insulated gate bipolar transistors (IGBTs), metal-oxide-semiconductor field-effect-transistors (MOSFETs), integrated gate-commutated thyristors (IGCTs) or other types of transistors. The switches may be made with Silicon (Si), Silicon Carbide (SiC), Gallium Nitride (GaN), or any suitable Wide Bandgap (WBG) material. In some example embodiments, the switches are made of GaN or SiC. The states of the switches are controlled by the control circuit 140. There is a mathematical relationship between the input voltages and currents to the matrix converter 100, the output voltages and currents of the matrix converter 100, and the states of the switches. By controlling the states of the switches, the control circuit 140 is able to control the outputs of the matrix converter 100. In example embodiments of the disclosed concept, the control circuit 140 is structured to control the states of the switches in order to drive the electric motor 20.

The control circuit 140 is also structured to monitor power flowing through the matrix converter 100 based on outputs of the current sensors 110. The control circuit 140 is structured to provide circuit protection functionality such as that provided by an electronic trip unit in a circuit breaker. For example, the control circuit 140 is structured to receive sensed current levels from the current sensors 110. The control circuit 140 is structured to monitor the sensed current levels for faults in the power flowing through the matrix converter 100 and to initiate a trip in response to detecting a fault. It will be understood by those having ordinary skill in the art that control circuit 140 may detect many different types of faults and may determine whether and when to initiate a trip based on the type and severity of the fault.

The control circuit 140 initiates a trip by controlling the switches in the matrix of switches 130 to switch to prevent power from flowing internal to the matrix converter 100, or external to the electric motor 20. For example and without limitation, the control circuit 140 may cause the switches corresponding to the phases where faults are present to open. The switches are solid state components that are capable of switching very quickly.

The control circuit 140 is also structured to control the isolation switch 120 to open. When the control circuit 140 initiates a trip, the control circuit 140 may also control the isolation switch 120 to open after the switches have opened.

The control circuit 140 provides the combined control functionality of controlling the switches in the matrix of switches 130 to drive the electric motor 20 and the functionality of an electronic trip unit in a circuit breaker. The matrix of switches 130 is used both to provide AC-AC power conversion to drive the motor and as a switch to interrupt current flow as part of a solid state circuit breaker functionality. By integrating circuit breaker functionality into the matrix converter 100, the matrix converter 100 does not need an external circuit breaker to provide protection for it. Additionally, by using the matrix of switches 130 for dual purposes, the functionality of the matrix converter 100 is increased without the addition of too many extra components.

In some example embodiments, the control circuit 140 may include a processor and associated memory. The memory may be included in the processor or as a separate component. The processor may be, for example and without limitation, a microprocessor, a microcontroller, or some other suitable processing device or circuitry, that interfaces with the memory or another suitable memory. The memory may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory may also store one or more routines that the processor is structured to execute.

In the example embodiments shown in FIG. 3, the current sensors 110 are shown at the input of the matrix converter 100. However, it will be appreciated by those having ordinary skill in the art that the current sensors 110 may be disposed alternatively or additionally by the output of the matrix converter 100 without departing from the scope of the disclosed concept. It will also be appreciated by those having ordinary skill in the art that the control circuit 140 may use inputs from other sensors (not shown) in determining whether to initiate a trip. For example, the control circuit 140 may initiate a trip based on inputs from voltage and/or temperature sensors.

Although not shown, the matrix converter 100 may also include a power circuit. The power circuit may convert or harvest power from the power source 10 and use such power to power the control circuit 140 and/or other components of the matrix converter 100.

In some example embodiments of the disclosed concept, the matrix converter 100 may also include a snubber circuit. The snubber circuit may be electrically coupled any of various points between the inputs and outputs of the matrix converter 100. The snubber circuit includes one or more resistors, diodes, and capacitors arranged as a snubber. The snubber circuit is structured to absorb energy and provide protection against events such as voltage transients.

The matrix converter 100 shown in the example embodiment of FIG. 3 is one example of a type of matrix converter. For example, the matrix converter 100 of FIG. 3 includes a matrix of switches 130 including 18 bi-directional switches. However, it will be appreciated that the disclosed concept is applicable to various different types of matrix converters.

For example, FIGS. 4-8 illustrate matrix converters in accordance with some other example embodiments of the disclosed concept. Although the isolation switch 120 is not illustrated in the matrix converters of FIGS. 4-8, is will be appreciated by those having ordinary skill in the art that isolation switches may be employed in the matrix converters of FIGS. 4-8 without departing from the scope of the disclosed concept.

Figure 4:
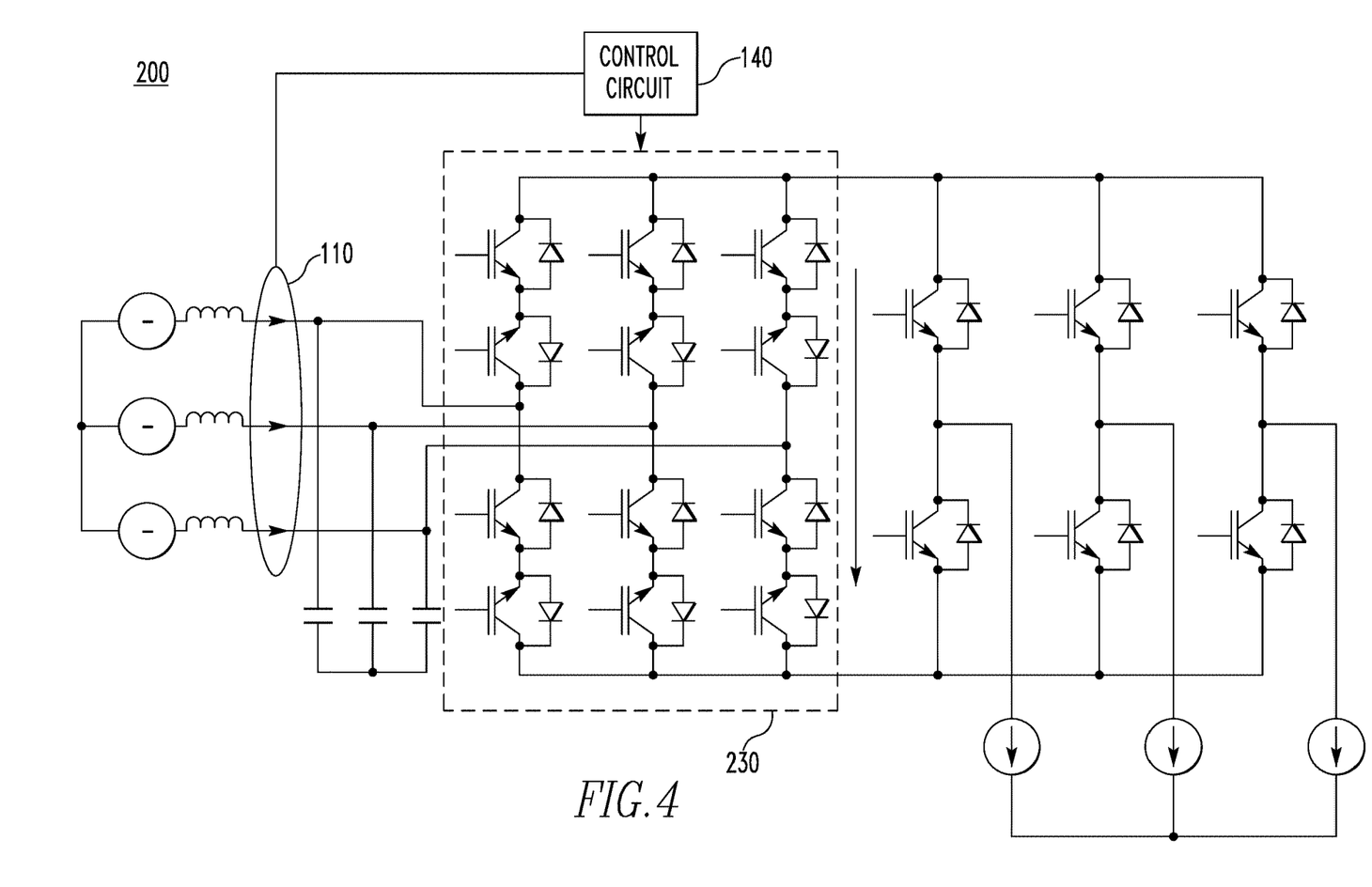
FIGS. 4-8 are diagrams of matrix converters in accordance with other example embodiments of the disclosed concept.

FIG. 4 is a diagram of a matrix converter 200 in accordance with an example embodiment of the disclosed concept. The matrix converter 200 of FIG. 4 includes 18 switches, with 12 of them being bi-directional, but is arranged differently than the matrix converter 100 of FIG. 3. In the matrix converter 200 of FIG. 4, a matrix of switches 230 including 12 bi-directional switches is used by the control circuit 140 to initiate a trip as part of the solid state circuit breaker functionality.

Figure 5:
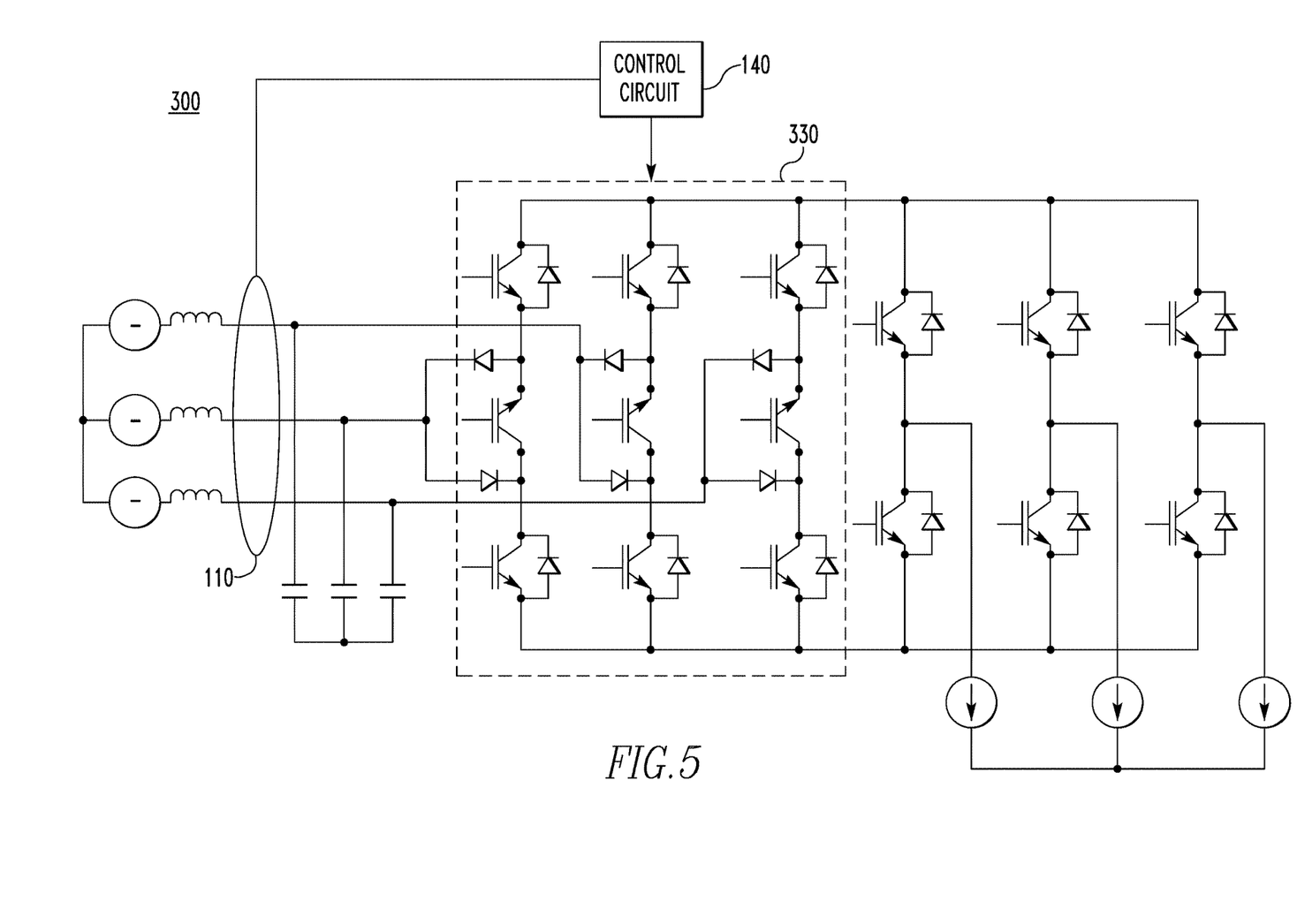

FIG. 5 is a diagram of a matrix converter 300 in accordance with an example embodiment of the disclosed concept. The matrix converter 300 of FIG. 5 includes 15 switches and includes a matrix of switches 330 including 9 switches used by the control circuit 140 to initiate a trip as part of the solid state circuit breaker functionality.

Figure 6:
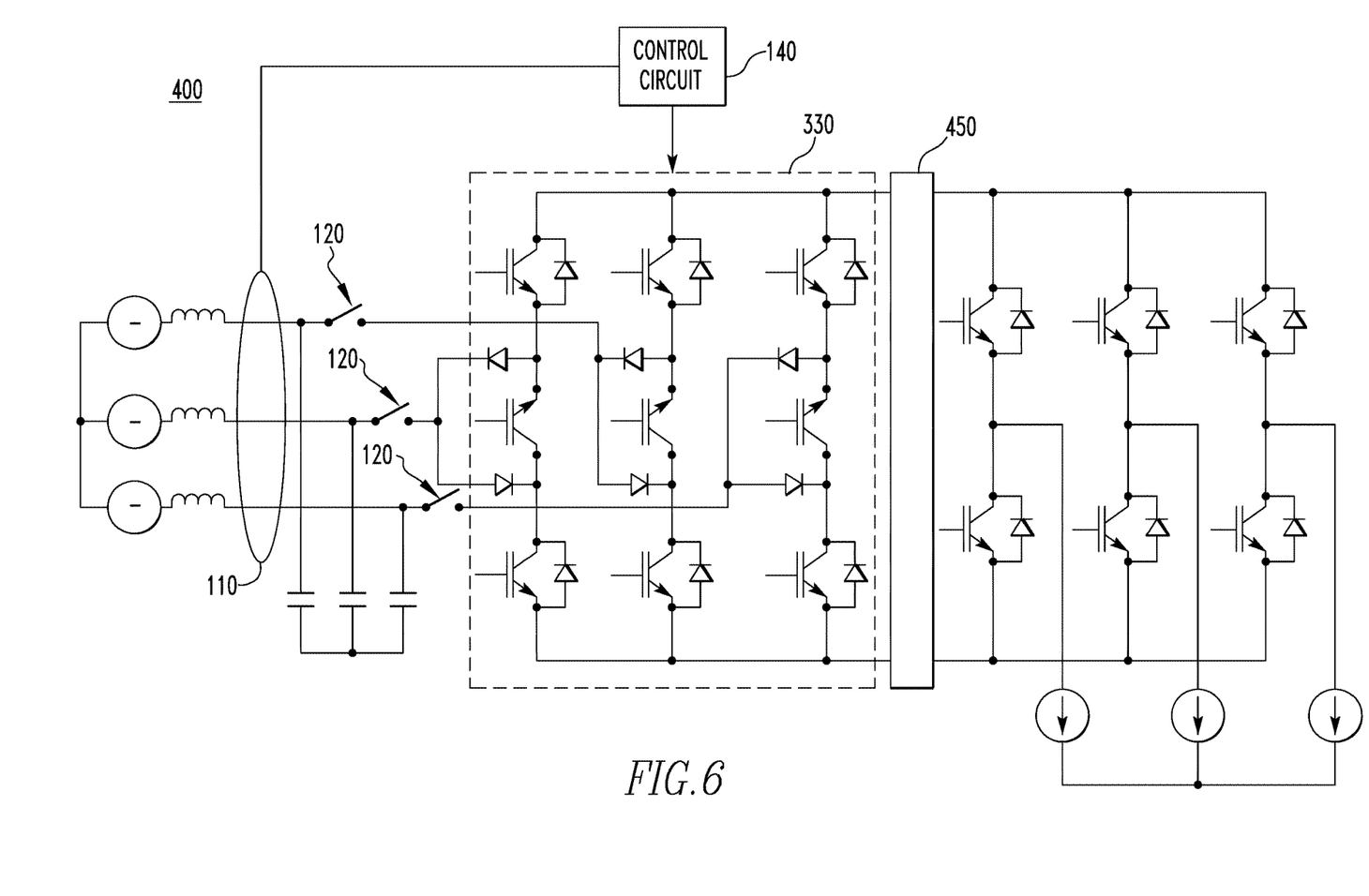

FIG. 6 is a diagram of a matrix converter 400 in accordance with an example embodiment of the disclosed concept. The matrix converter 400 of FIG. 6 is similar to the matrix converter 300 of FIG. 5. However, the matrix converter 400 of FIG. 6 is illustrated as also including an isolation switch 120 and a snubber circuit 450. It will be appreciated that by those having ordinary skill in the art that the isolation switch 120 and/or the snubber circuit 450 may be employed in any of the example embodiments disclosed herein.

Figure 7:
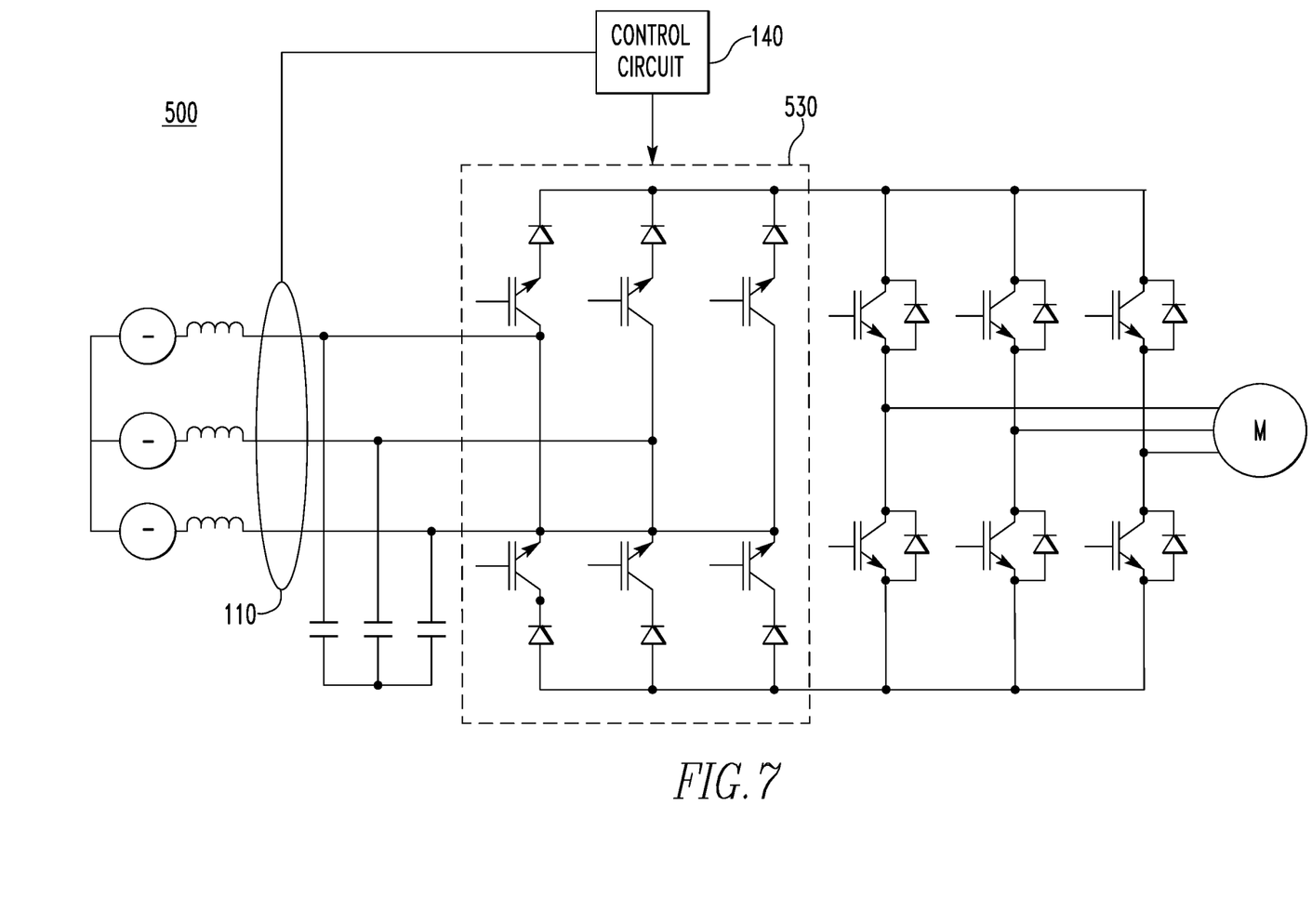

FIG. 7 is a diagram of a matrix converter 500 in accordance with an example embodiment of the disclosed concept. The matrix converter 500 of FIG. 7 includes 12 switches and includes a matrix of switches 530 including 6 switches used by the control circuit 140 to initiate a trip as part of the solid state circuit breaker functionality.

Figure 8:
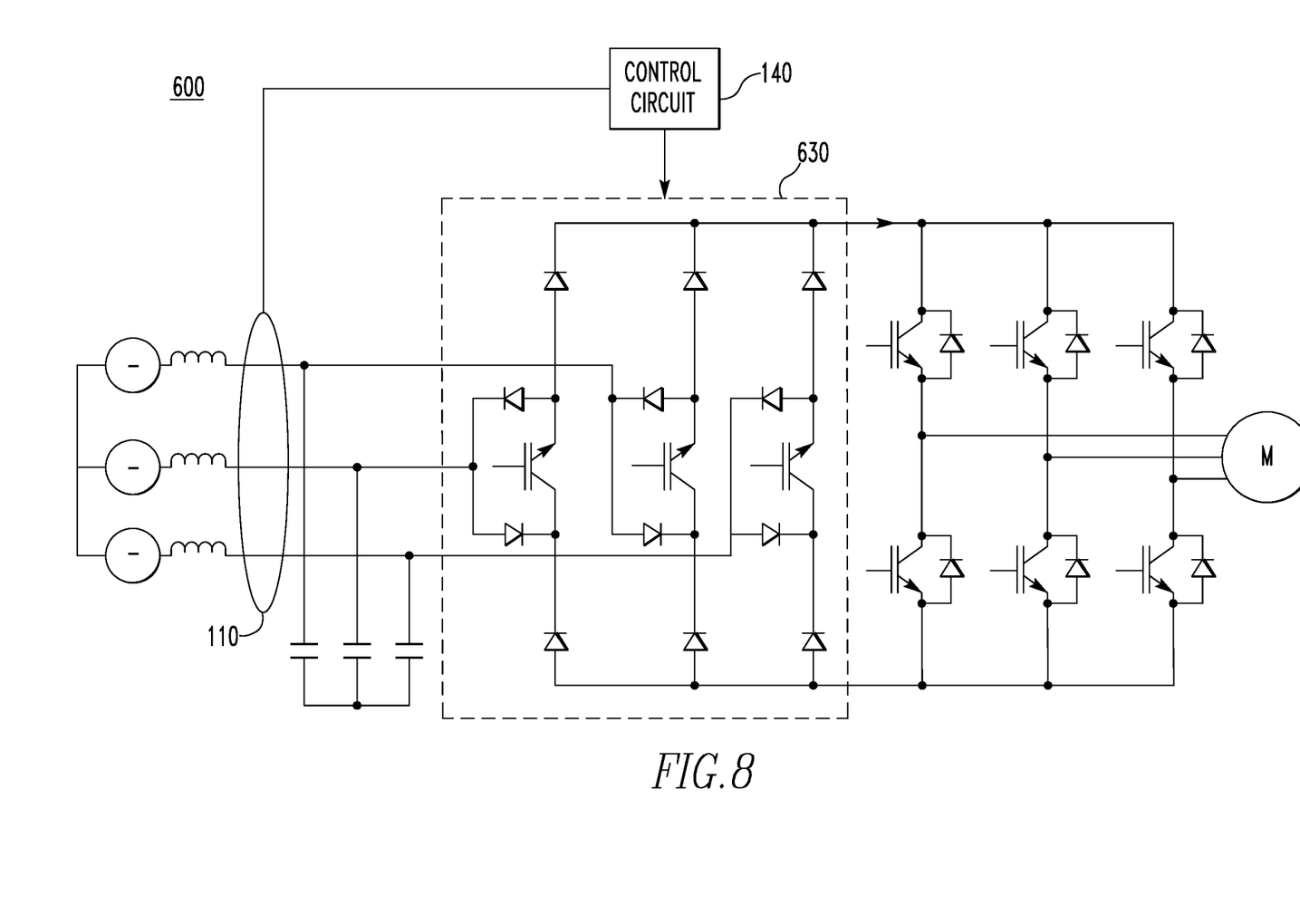

FIG. 8 is a diagram of a matrix converter 600 in accordance with an example embodiment of the disclosed concept. The matrix converter 600 of FIG. 8 includes 9 switches and includes a matrix of switches 630 including 3 switches used by the control circuit 140 to initiate a trip as part of the solid state circuit breaker functionality.

While FIGS. 3-8 illustrate different arrangements of matrix converters in accordance with example embodiments of the disclosed concept, it will be appreciated by those having ordinary skill in the art that these arrangements are just some examples of applications of the disclosed concept. It will be appreciated that the disclosed concept may be employed in any suitable type of matrix converter. It will also be appreciated by those having ordinary skill in the art that example embodiments may be modified by adding, subtracting, and/or rearranging components without departing from the scope of the disclosed concept. It will further be appreciated by those having ordinary skill in the art that the disclosed concept may be applied to technical fields other than motor control without departing from the scope of the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A matrix converter comprising:
    one or more current sensors structured to sense current flowing through the matrix converter;
    a matrix of switches including a number of solid state transistors;
    an isolation switch electrically coupled between an input to the matrix converter and the matrix of switches, and configured to provide galvanic isolation between an input of the matrix converter and the matrix of switches; and
    a control circuit structured to detect faults in power flowing through the matrix converter based on the sensed current, to control the matrix of switches to drive an external device, to control the matrix of switches to switch to prevent power from flowing internal to the matrix converter, or external to the external device in response to detecting a fault in power flowing through the matrix converter, and to control the isolation switch to open after the matrix of switches has been switched to prevent power from flowing internal to the matrix converter and external to the external device.

2. The matrix converter of claim 1, wherein the isolation switch is a clinch joint.

3. The matrix converter of claim 1, wherein control circuit is structured to control the matrix of switches to drive the external device by controlling states of the number of solid state transistors.

4. The matrix converter of claim 1, wherein the number of solid state transistors includes at least one of an insulated gate bipolar transistor (IGBT), a metal-oxide-semiconductor field-effect-transistor (MOSFET), or an integrated gate-commutated thyristor (IGCT).

5. The matrix converter of claim 1, wherein one or more of the solid state transistors are composed of at least one of Silicon (Si), Silicon Carbide (SiC), or Gallium Nitride (GaN).

6. The matrix converter of claim 1, wherein the control circuit is structured to control the matrix of switches to provide AC-AC conversion of power flowing through the matrix converter.

7. The matrix converter of claim 1, wherein the external device is an electric motor.

8. The matrix converter of claim 1, further comprising:
    a snubber circuit structured to absorb energy and provide protection against voltage transients.

9. The matrix converter of claim 1, wherein the matrix of switches includes a plurality of switches each including one of the number of solid state transistors and a corresponding diode.

10. The matrix converter of claim 9, wherein the plurality of switches are bi-directional switches.

11. The matrix converter of claim 9, wherein the control circuit is structured to control a subset of the plurality of switches to switch to prevent power from flowing internal to the matrix converter, or external to the external device in response to detecting a fault in power flowing through the matrix converter.

12. The matrix converter of claim 9, wherein the plurality of switches are at least 12 switches.

13. An electric motor and drive system comprising:
    a power source;
    an electric motor; and a matrix converter comprising:
  one or more current sensors structured to sense current flowing through the matrix converter from the power source to the electric motor;
  a matrix of switches including a number of solid state transistors;
  an isolation switch electrically coupled between an input to the matrix converter and the matrix of switches, and configured to provide galvanic isolation between an input of the matrix converter and the matrix of switches; and
  a control circuit structured to detect faults in power flowing through the matrix converter based on the sensed current, to control the matrix of switches to drive the electric motor, to control the matrix of switches to switch to prevent power from flowing internal to the matrix converter, or external to the electric motor in response to detecting a fault in power flowing through the matrix converter, and to control the isolation switch to open after the matrix of switches has been switched to prevent power from flowing internal to the matrix converter and external to the external device.

* * * * *